No. 866,449. PATENTED SEPT. 17, 1907.
B. C. FEIST.
JARDINIERE.
APPLICATION FILED JAN. 12, 1907.

WITNESSES
J. A. Brophy
F. D. Ammen

INVENTOR
Bertha C. Feist
BY Munn & Co
ATTORNEYS

UNITED STATES PATENT OFFICE.

BERTHA CHARLOTTE FEIST, OF ASPEN, COLORADO.

JARDINIÈRE.

No. 866,449.         Specification of Letters Patent.         Patented Sept. 17, 1907.

Application filed January 12, 1907. Serial No. 351,966.

*To all whom it may concern:*

Be it known that I, BERTHA CHARLOTTE FEIST, a citizen of the United States, and a resident of Aspen, in the county of Pitkin and State of Colorado, have invented a new and Improved Jardinière, of which the following is a full, clear, and exact description.

This invention relates to jardinières or flower pots such as used for plants used in houses, or for decorative purposes.

The object of the invention is to produce a jardinière which will afford means for holding a potted plant without exposing the pot or can in which the plant is rooted.

The invention consists in the construction and combination of parts to be more fully described hereinafter and particularly set forth in the claims.

Reference is to be had to the accompanying drawings forming a part of this specification, in which similar characters of reference indicate corresponding parts in both figures.

Figure 1:
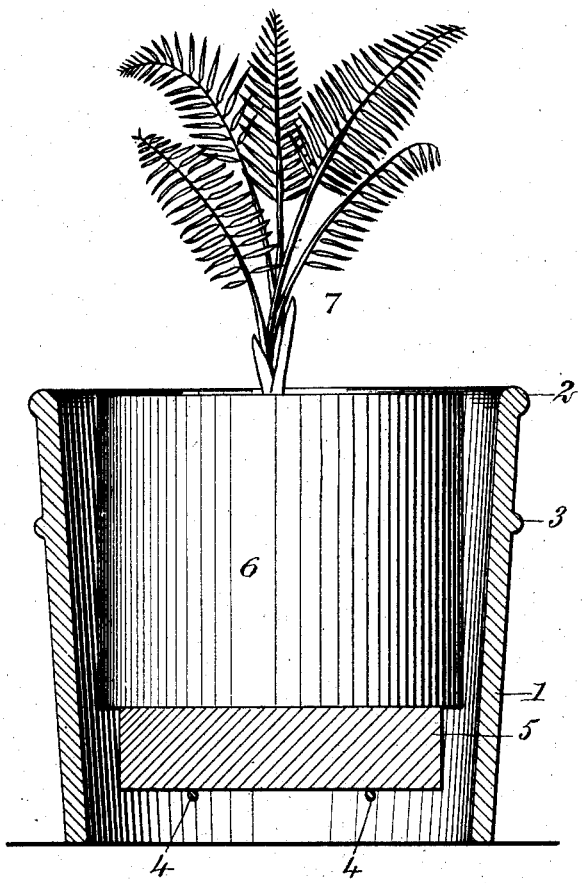
Figure 2:
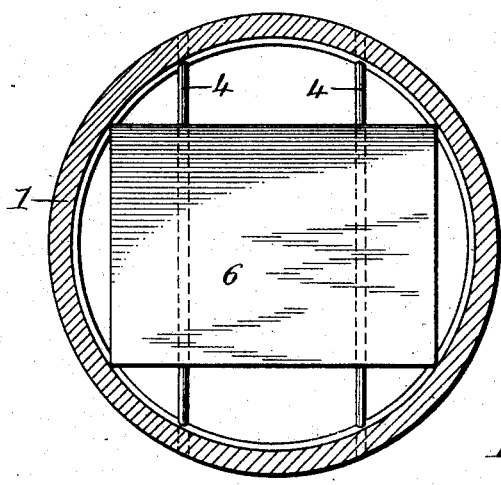

Figure 1 is a vertical central section through the jardinière, showing the pot or can which holds the plant, in elevation; and Fig. 2 is a horizontal cross section through the jardinière, the pot or can holding the plant, being removed.

Referring more particularly to the parts, 1 represents the body of the jardinière, which is of slightly conical form, tapering toward the ground line. This body simply presents a side wall, and is bottomless, as indicated. At its edge portion it may be provided with an ornamental rim 2 near which is provided a circumferential bead 3. In the lower portion of the jardinière I provide a pair of transversely disposed bars or wires 4, the ends of which are embedded in the wall thereof, as indicated. These bars are disposed horizontally and opposite to each other in a parallel relation, so that they are adapted to support a removable block 5 in the lower portion of the jardinière, as indicated. Upon this block rests the pot or can 6 in which the plant 7 is rooted. The bars 4 should be sufficiently depressed within the jardinière to enable its body to substantially conceal the can or pot 6. With this arrangement, when the jardinière is viewed from a short distance, it gives the effect as though the plant were simply rooted in the jardinière. The body 1 of the jardinière may be formed of any molded fiber, papier mâché, or similar material that is light and not collapsible.

Where the inner pot or can which contains the plant, is unusually deep, the block 5 may be dispensed with and the inner pot will rest directly upon the bars 4. It may be stated, further, that the block 5 is especially useful where the inner can or pot is of unusually small dimensions. Where the diameter of the inner pot is sufficiently great to bridge the space between the bars 4, in many instances the block 5 may be dispensed with. The block 5 is of substantially square or rectangular form, as shown. When placed within the body of the jardinière, its corners lie adjacent to the wall thereof, so that they substantially prevent the block shifting laterally out of the central position in which it should be held.

The fact that the block does not conform to the shape or cross section of the body 1, is advantageous in that it facilitates the removal of the block, as spaces are afforded around its edge where the block may be grasped with one's hand.

Having thus described my invention, I claim as new and desire to secure by Letters Patent:

1. A jardinière having a body with transversely disposed bars in the lower portion thereof, said bars having their ends embedded in the wall of said body and being adapted to support a potted plant within said body.

2. A jardinière having a body with transversely disposed bars in the lower portion thereof, a block supported on said bars and adapted to support a potted plant thereabove.

3. A jardinière having a bottomless body with transversely disposed bars in the lower portion thereof, said bars having their ends embedded in the wall of said body, a removable block supported on said bars and presenting corners lying adjacent to the said wall whereby said block is maintained in a central position adapted to support a potted plant within said body.

In testimony whereof I have signed my name to this specification in the presence of two subscribing witnesses.

BERTHA CHARLOTTE FEIST.

Witnesses:
ANDREW MULQUEEN,
CHAS. J. FEIST.